3,377,380
DIBENZOCYCLOHEPTENYL
CARBOXYHYDRAZIDES
Martin A. Davis, Montreal, Quebec, Canada, assignor to American Home Products Corporation, New York, N.Y., a corporation of Delaware
No Drawing. Filed Feb. 15, 1966, Ser. No. 527,518
7 Claims. (Cl. 260—558)

ABSTRACT OF THE DISCLOSURE

There are disclosed herein 10,11 - dihydro - 5H - dibenzo[a,d]cycloheptene - 5 - carboxyhydrazide and its hydrochloride salt, as well as its $N^1$-isopropyl and $N^1$-(1-methyl - 2- phenylethyl) derivatives. The intermediate acetone and 1-phenyl-propan-2-one 10,11 - dihydro-5H-dibenzo[a,d]cycloheptene - 5 - carboxyhydrazones are also disclosed. The compounds have larvicidal; trichomonicidal and anticonvulsant activities, and methods for their preparation and use are also disclosed.

This invention relates to novel chemical compounds having useful biological properties. More particularly this invention relates to novel hydrazides of 5H-dibenzo[a,d] cycloheptene-5-carboxylic acid of the following general Formula I

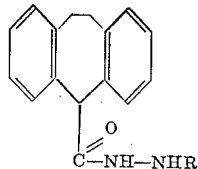

wherein R represents hydrogen, a lower alkyl, or an aralkyl group. Exemplary of the latter two groups are methyl, 2-propyl, 1 - methyl - 2 - phenylethyl and benzyl groups optionally substituted in the aromatic ring. Also encompassed within the scope of this invention are the acid addition salts of the above designated hydrazides with pharmacologically acceptable, non-toxic inorganic and organic acids, such as, for example hydrochloric, phosphoric, citric and maleic acids, and intermediates used in their preparation.

The compounds of this invention of Formula I in which R represents hydrogen may be conveniently secured by the interaction of a 5H-dibenzo[a,d]cycloheptene - 5 - carboxylic acid halide with a molar excess of hydrazine in an inert solvent. Thus, treatment of an ethereal solution of hydrazine with 10,11 dihydro - 5H - dibenzo[a,d] cycloheptene-5-carbonyl chloride (prepared as described in J. Med. Chem. 6, 251 (1963)), gives, after suitable processing of the reaction mixture, the hydrazide of Formula I in which R represents hydrogen. An alternative route to this hydrazide involves treatment of methyl 10, 11-dihydro - 5H - dibenzo[a,d]cycloheptene-5-carboxylate with a molar excess of hydrazine at an elevated temperature.

On the other hand, if the above acid chloride is reacted with a substantially equivalent amount of hydrazine, the compound 1,2 - bis(10,11 - dihydro - 5H - dibenzo[a,d] cycloheptene - 5 - carbonyl)hydrazine is obtained. The latter compound is also occasionally obtained as by-product in the reaction described in the preceding paragraph, and is also obtained as a minor by-product when the hydrazide of Formula I in which R represents hydrogen is connected to its hydrochloride salt by means of methanolic hydrogen chloride. It may be represented by the Formula II

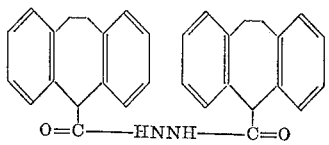

The hydrazides of Formula I in which R represents alkyl or aralkyl groups may be conveniently obtained from the unsubstituted compound in the following manner. The hydrazide is heated with a carbonyl compound such as an aldehyde or a ketone either alone or in an inert solvent such as benzene. The resultant hydrazone may then be reduced to the corresponding hydrazide, preferably by treatment with an alkali metal borohydride in a lower alkanol solvent. Advantageously one may use sodium borohydride in ethanol, carrying out the reaction at the boiling point of this solvent. Using the ketones acetone and 1 - phenyl - 2 - propanone thus gives the hydrazides of Formula I in which R represents $CH(CH_3)_2$ and $CH(CH_3)CH_2C_6H_5$, respectively.

The compounds of this invention possess important biological properties and are valuable as medicaments. Thus the hydrazide of Formula I in which R represents hydrogen has larvicidal properties and may be used in premises or pastures infected with horse-strongyles or other members of Strongylidae family, for example hookworms, Trichostrongylidae or Metastrongylidae. For this purpose the compound may be formulated either as a suspension of the free base in an aqueous vehicle or as an aqueous solution of a suitable acid addition salt, for example the hydrochloride salt. In either case the amount of active ingredient present may be within the range of from 0.01 to 0.0005 mole per litre.

The compounds of this invention also have trichomonicidal activity against *T. foetus* and are trichomonicidal agents. As such they may be formulated with suitable excipients in the form of vaginal suppositories or vaginal inserts containing from 50 mg. to 500 mg. of the active ingredients, and may be administered twice daily for periods of time of from two to several weeks.

In addition to the abovementioned properties the novel hydrazides have important effects on the central nervous systems of mammals. Most noteworthy, the compound of Formula I in which R represents hydrogen has a marked anticonvulsant activity and is an anticonvulsant agent. As such it may be formulated, either as the free base or as an acid addition salt, as dry powder capsules or compressed tablets suitable for oral administration containing from 50 mg. to 250 mg. of the active ingredient to be given once to four times daily. Additionally, the compounds possess calmative properties and may be useful in the treatment of agitation and certain disorders characterized by excited states.

The following formulae in which R is as defined above and Z represents Cl or $OCH_3$, and the descriptive examples will serve to illustrate this invention but are not to be construed as limiting it thereto. All the compounds described in the following examples are identified by elemental analysis.

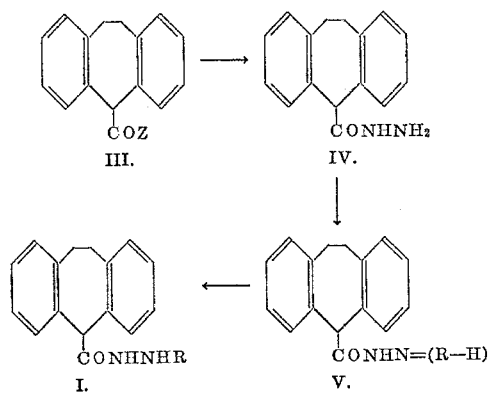

In the above formulae, (R—H) represents the group R as defined above, minus one atom of hydrogen. The hydrazones of Formula V are useful as intermediates in the preparation of the carboxyhydrazides of Formula I.

Example 1.—10,11-dihydro-5H-dibenzo[a,d]cycloheptene-5-carboxyhydrazide (a) A mixture of methyl 10,11-dihydro-5H-dibenzo[a,d]cycloheptene-5-carboxylate (4.4 g., 0.02 mole) and anhydrous hydrazine (3.4 g., 0.10 mole) is heated under reflux for 2½ hours and then poured into ice-water. The white precipitate is thoroughly washed with water, dried in vacuo, and recrystallized from ethanol to yield the title compound with M.P. 162–164° C.

(b) 10,11-dihydro - 5H - dibenzo[a,d]cycloheptene-5-carbonyl chloride (10.0 g., 0.04 mole) in anhydrous ether (100 ml.) is added dropwise with vigorous stirring to anhydrous hydrazine (10.0 g., 0.3 mole) in anhydrous ether (10 ml.) The white precipitate is treated with sodium bicarbonate solution and extracted into dichloromethane. Removal of the solvent in vacuo yields a white solid which is recrystallized from ethanol to yield the title compound, M.P. 162–164° C.

The hydrazide (5 g., 0.02 mole) obtained as above is suspended in methanol and methanolic hydrogen chloride is added with vigorous stirring until the solution is acidic. The solvent is removed in vacuo and the residue stirred with ether.

The colourless solid obtained in this manner is recrystallized from ethanol to yield 10,11-dihydro-5H-dibenzo[a,d]cycloheptene - 5 - carboxyhydrazide hydrochloride, M.P. 234–237° C. As a minor by-product there is also obtained the bis-hydrazine of Formula II.

Example 2

10,11-dihydro-5H-dibenzo[a,d]cycloheptene-5-carboxyhydrazide obtained as described in Example 1 (5.9 g., 0.023 moles) is heated under reflux for four hours in acetone (150 ml.). The solvent is removed in vacuo to yield acetone 10,11-dihydro-5H-dibenzo[a,d]cycloheptene-5-carboxyhydrazone, recrystallized from 2-propanol to M.P. 191–192° C.

Example 3

The hydrazone obtained as described in Example 2, (4.5 g., 0.015 mole) is heated under reflux in anhydrous ethanol with sodium borohydride (1.1 g., 0.03 mole) for 24 hours. The reaction mixture is cooled, diluted with twice its volume of water and extracted into dichloromethane. The organic layer is dried over anhydrous sodium sulfate and the solvent is removed in vacuo to yield $N^1$ - isopropyl-10,11-dihydro-5H-dibenzo[a,d]cycloheptene-5-carboxyhydrazide, recrystallized from 2-propanol to M.P. 151–152° C.

Example 4

The hydrazide obtained as described in Example 1 (10.0 g., 0.04 moles) and 1-phenylpropan-2-one (6.4 g., 0.05 moles) are heated under reflux in benzene (150 ml.) for five hours. The solvent is removed in vacuo and the oily residue stirred with petroleum ether (B.P. 30–60° C.) to yield 1-phenylpropan-2-one 10,11-dihydro-5H-dibenzo[a,d]cycloheptene - 5 - carboxyhydrazone, recrystallized from ethanol to M.P. 136–137° C.

Example 5

The hydrazone obtained as described in Example 4 (7.16 g., 0.02 moles) is heated under reflux in anhydrous ethanol (450 ml.) with sodium borohydride (3.0 g.) overnight. The reaction mixture is cooled, poured into water (1000 ml.) and extracted with dichloromethane. The organic layer is dried over anhydrous sodium sulfate and the solvent is removed in vacuo to furnish a yellow-oil which is crystallized by addition of anhydrous ether. Recrystallization from hexane yields $N^1$-(1-methyl-2-phenylethyl)-10,11-dihydro - 5H - dibenzo[a,d]cycloheptene-5-carboxyhydrazide, M.P. 109–110° C.

Example 6

10,11-dihydro - 5H - dibenzo[a,d]cycloheptene-5-carbonyl chloride (12.5 g., 0.05 mole) is dissolved in anhydrous ether (75 ml.) and the solution added dropwise, at a moderately fast rate, to anhydrous hydrazine (3.25 g., 0.105 mole) in anhydrous ether (20 ml.). The product is collected by filtration, treated with sodium bicarbonate solution and extracted into dichloromethane. The organic layer is dried over sodium sulphate and the solvent removed in vacuo to yield 1,2-bis(10,11-dihydro-5H-dibenzo[a,d]cycloheptene-5-carbonyl)hydrazine, recrystallized from acetonitrile to M.P. 256–258° C. (dec.).

I claim:

1. A compound selected from the group which consists of bases of the formula

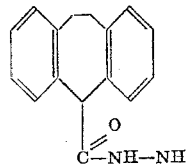

wherein R is selected from the group consisting of hydrogen, lower alkyl and 1-methyl-2-phenylethyl; and an acid addition salt thereof with a pharmacologically acceptable, non-toxic acid.

2. 10,11 - dihydro-5H-dibenzo[a,d]cycloheptene-5-carboxyhydrazide, as claimed in claim 1.

3. 10,11 - dihydro-5H-dibenzo[a,d]cycloheptene-5-carboxyhydrazide hydrochloride, as claimed in claim 1.

4. $N^1$ - isopropyl-10,11-dihydro-5H-dibenzo[a,d]cycloheptene-5-carboxyhydrazide, as claimed in claim 1.

5. $N^1$-(1-methyl - 2 - phenylethyl)-10,11-dihydro-5H-dibenzo[a,d]cycloheptene-5-carboxyhydrazide, as claimed in claim 1.

6. Acetone-10,11-dihydro - 5H - dibenzo[a,d]cycloheptene-5-carboxyhydrazone.

7. 1-phenylpropan - 2 - one-10,11-dihydro-5H-dibenzo[a,d]cycloheptene-5-carboxyhydrazone.

References Cited

UNITED STATES PATENTS 3,242,212   3/1966   Davis et al. _____ 260—558

JOHN D. RANDOLPH, *Primary Examiner.*

WALTER A. MODANCE, *Examiner.*

N. TROUSOF, *Assistant Examiner.*